(12) United States Patent
Martinez et al.

(10) Patent No.: US 8,576,218 B2
(45) Date of Patent: Nov. 5, 2013

(54) BI-DIRECTIONAL UPDATE OF A GRID AND ASSOCIATED VISUALIZATIONS

(75) Inventors: Edward A. Martinez, Hyderabad (IN);
Siddhartha Rai, Secunderabad (IN);
Ramani Ranjan Jagadeba, Hyderabad (IN); Adithya Nittor Vishwanath, Hyderabad (IN); Kaladhar Bapu V S Korasala, Hyderabad (IN); Tushar Bhatia, Hyderabad (IN); Rishab Govind, Hyderabad (IN); Nitin Mukhija, Hyderabad (IN); Abhishek Agarwal, Hyderabad (IN); Sonal Sawhney, Hyderabad (IN); Jeff Kelleran, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 12/337,648

(22) Filed: Dec. 18, 2008

(65) Prior Publication Data
US 2010/0156889 A1    Jun. 24, 2010

(51) Int. Cl.
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl.
USPC ............................ 345/418; 715/200; 715/277

(58) Field of Classification Search
None
See application file for complete search history.

(56) References Cited

U.S. PATENT DOCUMENTS

| 6,301,579 B1 * | 10/2001 | Becker ................................. 1/1 |
| 6,801,229 B1 | 10/2004 | Tinkler |
| 6,990,238 B1 | 1/2006 | Saffer et al. |

(Continued)

FOREIGN PATENT DOCUMENTS

KR    20060085563 A    7/2006

OTHER PUBLICATIONS

"SharePoint Data Visualization ", Retrieved at<<https://www.obacentral.com/ObaSolutionCollaterals/233/SharePoint-Visualization-White-Paper.pdf>>, pp. 1-14.

"Trends in Data Visualization Software for Business Users ", Retrieved at<<http://www.dmreview.com/issues/20000501/2183-1.html>>, Sep. 29, 2008, pp. 1-3.

(Continued)

Primary Examiner — Kee M Tung
Assistant Examiner — Haixia Du
(74) Attorney, Agent, or Firm — Hope Baldauff, LLC

(57) ABSTRACT

Architecture that facilitates the attachment of multiple visualization types (e.g., charts) to the data of a grid and the presentation of the visualization next to the grid. The infrastructure allows each data view to be associated with a set of visualizations. These visualizations are rendered along with the grid (in a separate presentation pane) so that the user does not have to switch context to perform analysis. The visualizations available include charts that show aggregate and/or non-aggregate data. In a server farm scenario, all user interactions such as drill-downs are provided. Server farm drill-downs for these visualizations can be obtained using MHTML (MIME hypertext markup language). The visualizations can be automatically updated when filters are applied on the grid, and when drill-down is performed on the visualization, the grid is automatically updated. The visualizations can be consumed from a web-based browser client and/or thick client, for example.

17 Claims, 12 Drawing Sheets

(56) References Cited

U.S. PATENT DOCUMENTS

| | | | |
|---|---|---|---|
| 6,995,768 | B2 | 2/2006 | Jou et al. |
| 7,446,769 | B2* | 11/2008 | Molander et al. ............. 345/440 |
| 7,685,229 | B1* | 3/2010 | George et al. ................. 709/203 |
| 2003/0212960 | A1* | 11/2003 | Shaughnessy et al. ....... 715/526 |
| 2006/0112123 | A1 | 5/2006 | Clark et al. |
| 2007/0005477 | A1 | 1/2007 | McAtamney |
| 2007/0028175 | A1 | 2/2007 | Moore et al. |
| 2007/0260970 | A1 | 11/2007 | Dorwart |
| 2008/0005677 | A1 | 1/2008 | Thompson |
| 2008/0168104 | A1 | 7/2008 | Kruger et al. |
| 2008/0195608 | A1 | 8/2008 | Clover |
| 2008/0209311 | A1* | 8/2008 | Agronik et al. ............... 715/234 |
| 2009/0089096 | A1* | 4/2009 | Schoenberg ..................... 705/3 |

OTHER PUBLICATIONS

"Nevron Chart for .NET Enterprise (zip)", Retrieved at<<http://software.techrepublic.com.com/abstract.aspx? docid=239544>>, Sep. 29, 2008, pp. 1-2.

"Grid FX—Summary", Retrieved at<<http://www.componentsource.com/products/grid-fx/summary.html>>, Sep. 29, 2008, pp. 1-2.

"International Search Report", Mailed Date: Jul. 1, 2010, Application No. PCT/US2009/064905, Filed Date: Nov. 18, 2009, pp. 9.

"SharePoint Data Visualization," Retrieved Sep. 29, 2008 from <<https://www.obacentral.com/ObaSolutionColiaterals/233/SharePoint-Visualization-White-Paper.pdf>>, pp. 1-14.

Chinese Official Action dated Jul. 25, 2013 in Chinese Application No. 200980151830.1.

* cited by examiner

BI-DIRECTIONAL UPDATE OF A GRID AND ASSOCIATED VISUALIZATIONS

BACKGROUND

Advances in computing hardware and software have facilitated the ability to store and retrieve enormous amounts of information. Networks have made this information accessible from virtually any location. Thus, users have the ability to search and review data in many different formats such as in a grid. However, in many cases the data returned is in tabular form, such that the user will have to mentally analyze key pieces of information about the data, such as trends, high and low values, and so on.

Data analysis users have long ago determined that providing a graphical representation of the data can greatly assist in understanding more about the data. For example, pie charts, bar charts, and the like provide an informative visualization as to characteristics about the data. Such representations can be found in spreadsheet applications that allow the user to select sets of data and to then represent the data as a chart, for example.

Customer management systems are valuable repositories of customer data. However, although reporting solutions such as provided in SQL server services allow a customer relations management user to derive some insights, there are several shortcomings. For example, some of the shortcomings include a lack of tight integration with the grid, lack of interactivity, and also the requirement of another software module to be installed on the system. Moreover, without the aid of useful visualizations it is difficult for a user to obtain insights that otherwise might be found from this data.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the attachment of multiple visualization types to the data (e.g., in a grid). The infrastructure allows each data view to be associated with a set of visualizations. One example of visualization is associated with charts, a charting module, and other applications aspects of visualizations.

The visualizations feature allows a visualization to be rendered based on the data in a grid. These visualizations are rendered along with the grid (in a separate presentation pane) so that the user does not have to switch context to perform analyses. The visualizations available include charts that show aggregate and/or non-aggregate data. In a server farm scenario, all user interactions such as drill-downs are provided. Server farm drill-downs are obtained using just a single page request-response or server round trip with the help of MIME format (e.g., message/rfc822) used by MHTML (MIME hypertext markup language). The code base for all features (including drill-downs) is consistent across a multi-server deployment, single server deployments, and deployments that are usable across the Internet. In other words, the architecture includes an application that can run in single-server mode, multi-server mode, Internet facing mode, and is also usable within a browser client or a standalone client such as an add-in (e.g., customer relation management) to a PIM (personal information manager) application (e.g., Outlook™ by Microsoft Corporation).

Additionally, the visualizations can be automatically updated when filters are applied on the grid. Conversely, when drill-down is performed on the visualization, the grid is automatically updated. This bi-directional update feature of the grid and associated visualization provides a unique and informative rendering to the user.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture includes a visualizations feature that allows visualizations (e.g., charts) to render alongside a grid. Various providers of these visualizations can be added in a pluggable manner. For example, a visualization provider can be a .Net charting module, which renders charts from aggregated and non-aggregated data from any grid (e.g., a customer relations management (CRM) environment). A provider is an application that can be used to render visualizations either for a browser client or an add-in client for a personal information manager (PIM) (e.g., Outlook™, by Microsoft Corporation) that can handle certain views. In other words, in a CRM context, the PIM client is not just a PIM, but the whole CRM application available in the form of a PIM add-in. Thus, the visualizations within the PIM are for the CRM add-in of the PIM. Visualizations are available in the PIM offline, as well as in normal modes.

In the context of a server-based application such as a customer relations management (CRM) application, the grids can be shown inside a browser window. The grids could also be shown in the personal information manager (PIM) CRM client, for example. CRM supports multi-tenancy when it is deployed in an online (e.g., over the Internet) environment. When deployed in a server environment on the Internet, for example, an application can run in a multi-server environment.

Visualizations such as charts made available with grid views provide a "smooth" user interface (UI) to allow users to access and use charts. Each grid provides a view of the data in the CRM. Each view basically is a query which retrieves data from the CRM database and shows it in the grid. The visualization is rendered based on the dataset returned by the query. Even though the data in the grid is shown in several pages, the visualization is made from the entire dataset (all pages of data). This allows a user to gain insights from viewing the data, which otherwise may not be seen in traditional grid pages.

This solution is novel over other implementations that derive insights based on dashboards and reports, for example, which do not expeditiously provide in-context visualizations alongside the data. In-context visualizations will allow users to derive insights from where the actual work is performed.

For example, the disclosed architecture allows the user to derive quick insights from the visualizations that depict aggregate and non-aggregate summaries of the data on the grid, and allow visualizations to reflect user actions on the grid, and vice versa, that is, updating of grid data using filters updates the visualizations, and drill-down on the visualization (chart) updates the grid data, and allows for use in a server farm scenario. Additionally, multiple visualization providers are allowed.

Figure 4:
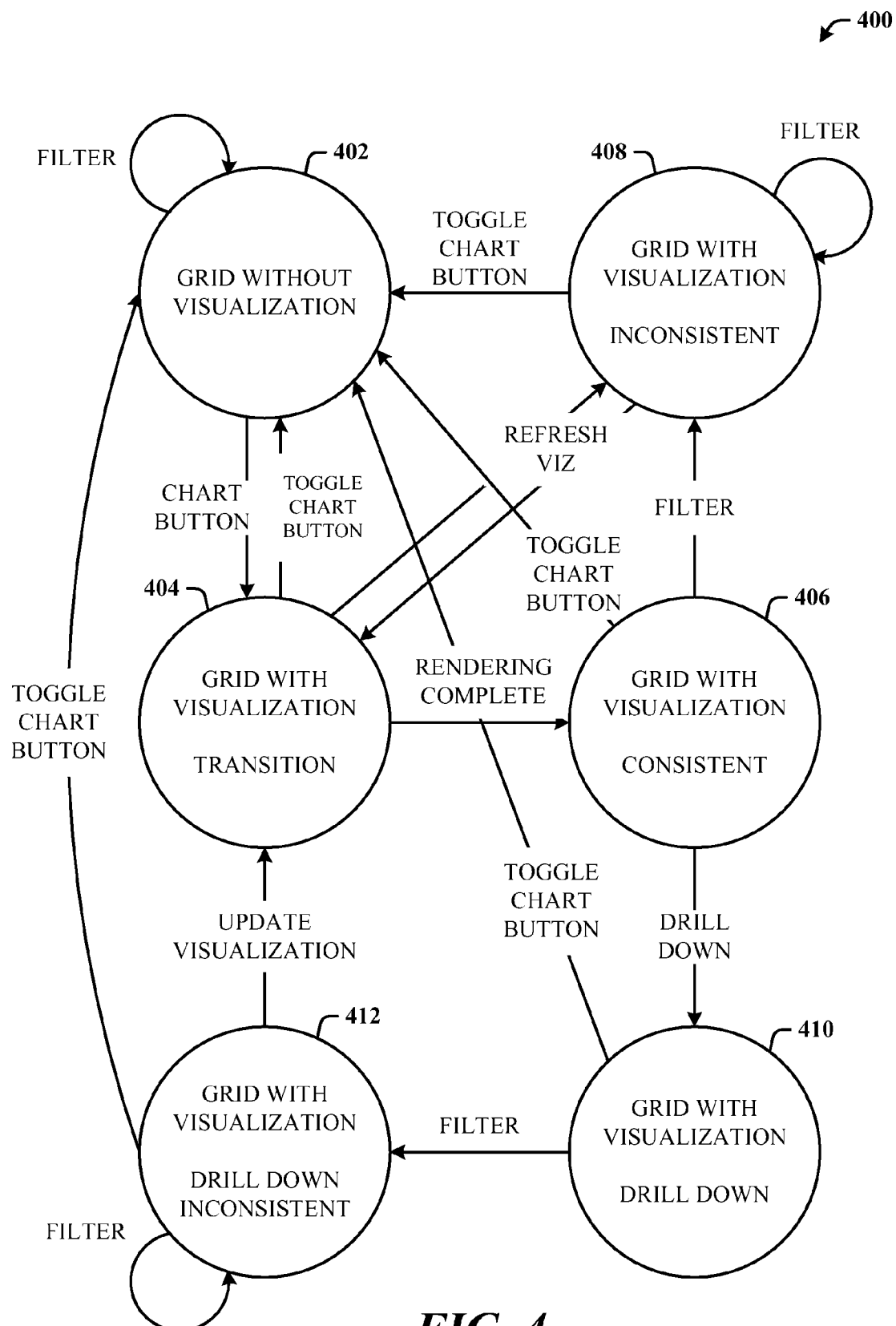
FIG. 4 illustrates an exemplary state diagram and attached visualization.

In one embodiment, and as represented in the state diagram of FIG. 4, the visualizations can be updated when the user manually selects an "Update Visualization" button on the visualization. Following is a sequence of actions that can occur in response to such update selection. A user views the visualization and the grid. The user applies a filter on a column. The visualization now becomes stale and shows the "Update Visualization" button (e.g., the button image is faded and displayed in the background). The user applies more filters to narrow down the data set. The user then clicks on the "Update Visualization" button to see the updated visualization.

An advantage of this approach is that because the visualization is not automatically updated, the visualization does not have to be refreshed each time a filter is applied on the grid. Updating the visualization on application of every filter incurs a significant performance overhead, since the visualization would be updated on the application of every filter. Moreover, automatic update would be a usability problem for the user since the visualization for the previous filter set would be underway while the user is applying a new filter. Such behavior can confuse the user; hence, manually updating provides a more viable approach. It is to be understood, however, that this is not to be construed as a limitation, in that the disclosed architecture can employed automatic update if desired.

As used herein, a chart depicts aggregate and non-aggregate data of the columns in the view. A chart is a specific kind of visualization. Aggregation functions can include sum, count, min, max and average, for example. Other aggregation functions can be added, as desired. Visualizations can be rendered in the offline mode as well. The offline mode refers to the ability of the PIM add-in to allow a user to work with data/grid/visualizations even if the user is not connected to the server. The add-in allows the user to use the same functionality that is available in the browser client within the framework of the PIM.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
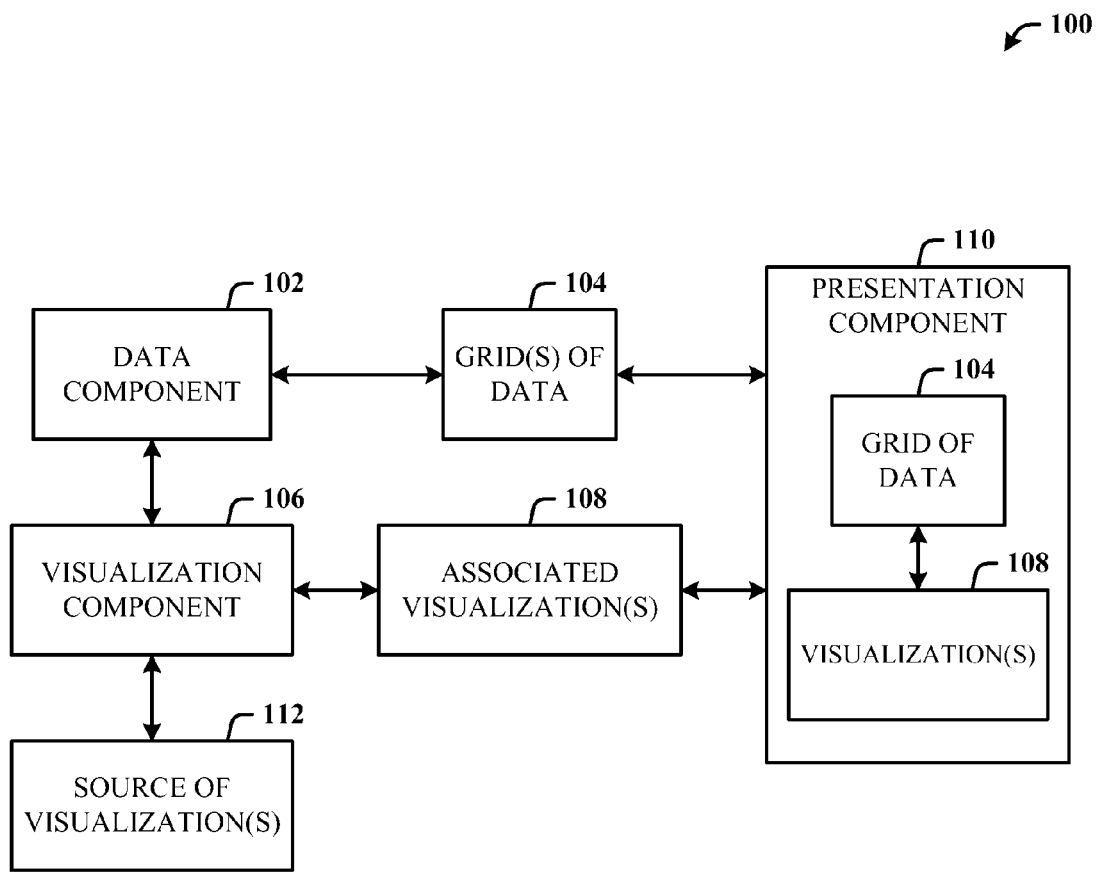
FIG. 1 illustrates a computer-implemented data viewing system in accordance with the disclosed architecture.

FIG. 1 illustrates a computer-implemented data viewing system 100 in accordance with the disclosed architecture. The system 100 includes a data component 102 for generating one or more grids 104 of data, a visualization component 106 for associating one or more visualization(s) 108 with the data of the grid(s) 104, and a presentation component 110 for presenting the visualization(s) 108 in combination with the grid data. The visualization component 106 can access a source 112 of the visualizations. The source 112 can be third-party vendors that provide visualizations as auxiliary code or "plug-ins", for example.

Other aspects described herein include the grid 104 rendering aggregate data and/or non-aggregate data, a visualization 108 can be automatically updated when a filter is applied to the grid data, and the grid can be automatically updated in response to an interactive drill-down on the visualization. Additionally, the visualizations 108 are rendered proximate the grid in a server-based application, and a visualization can be formed using an image and an image map that are both received in response to a single request for drill-down. A "sticky" behavior for the visualizations can also be implemented such that even if the user navigates away from the grid and returns, the user may continue to see the same visualization.

Note that although depicted using bi-directional arrows between the system 100 entities, this is not a requirement. For example, the source of the visualizations 112 need not consume information from the visualization component 106.

Figure 2:
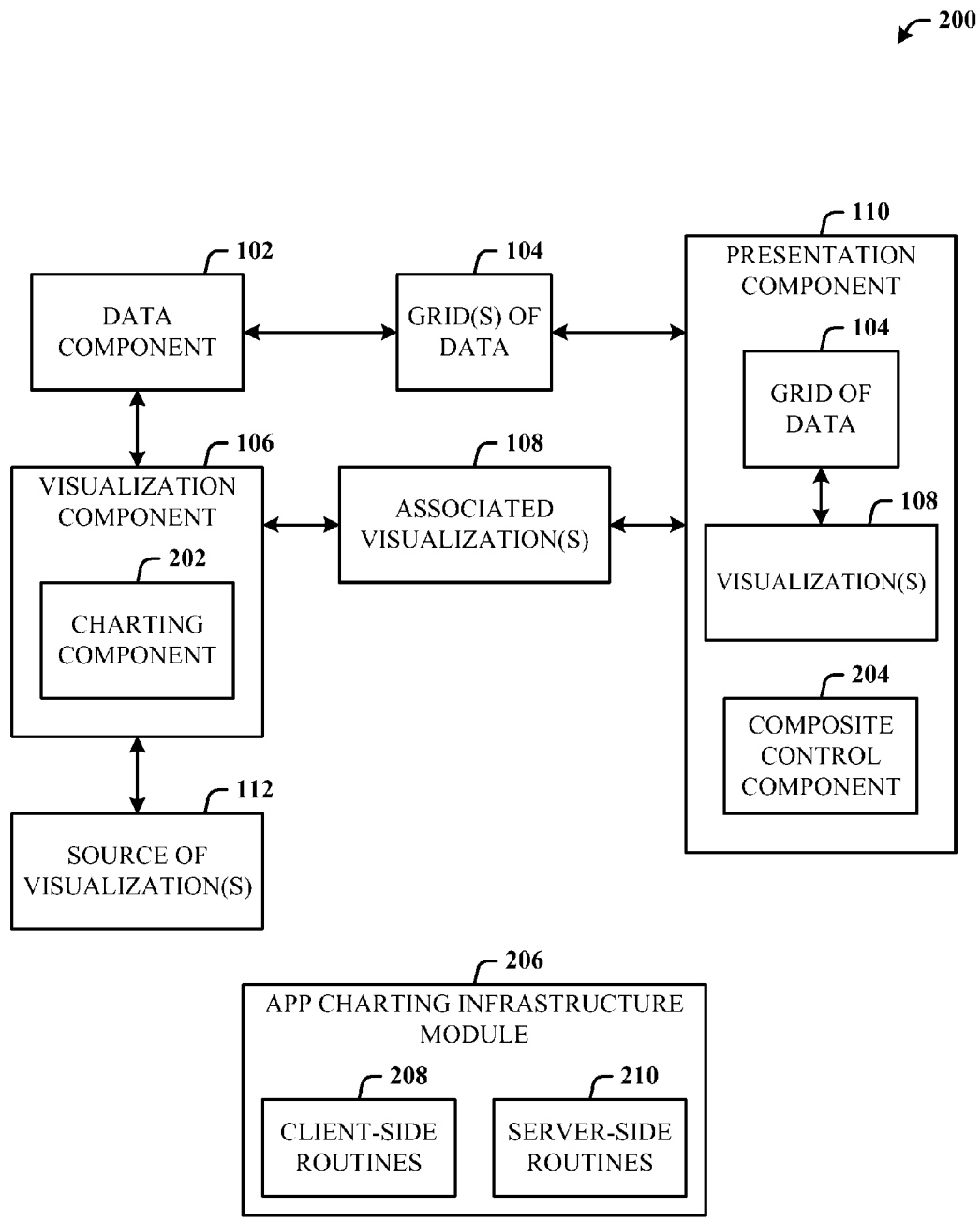
FIG. 2 illustrates an alternative data viewing system.

FIG. 2 illustrates an alternative data viewing system 200. The system 200 includes the data component 102 for generating one or more grids 104 of data, the visualization component 106 for associating one or more visualization(s) 108 with the data of the grid(s) 104, and the presentation component 110 for presenting the visualization(s) 108 in combination with the grid(s) 104 or grid data, as accessed and provided by the source 112 of the visualizations.

In this embodiment, the system 200 further illustrates a charting component 202 that provides the logic to use a charting library (e.g., .Net based) to display the data. The charting component 202 also includes logic to stream a chart image to the client, drill-downs on specific charts, localization, internationalization, data-formatting, configuring the chart using the template XML (e.g., .Net based) and applying the series data points to the charts. The charts generated by the charting component 202 are then shown in a visualization pane by the presentation component 110.

In support thereof, the presentation component 110 further includes a composite control component 204 that defines an interface for all web UI controls so that the control component 204 can be included on the pages. Note that the disclosed architecture finds application to business applications such as customer relationship management (CRM) for the display and visualization of customer information. Accordingly, the composite control component 204 can include a CRM grid control and a visualization pane control as child controls. The CRM grid control can be repackaged for inclusion on entity pages. The visualization pane control can be an ASP.Net user control, and a container for the visualizations.

The composite control component 204 can be employed as a stand-alone control on the entity pages. Moreover, the composite control component 204 allows the user to select relative sizing and layouts for the grid and the pane. The visualization pane can be hidden or expanded to occupy the entire space where the grid is presented, and can be shown in locations relative to the grid, such as on the right or top of the grid, for example. Therefore, the composite control can be dropped at all places on the page where a grid control can be dropped. The composite control allows for a visualization pane to be shown with the grid.

The system 200 can further include an application charting infrastructure module 206, which is a collection of client-side routines 208 and server-side routines 210 that enable the charting component 202 and composite control component 204 to function. The infrastructure includes the methods to construct an aggregated fetch request, fetch the data, enable drill-downs by extending the queries, convert the data into a format (e.g., .Net) that can be consumed, compute the pixel size of the charts based on the available real-estate, etc. When employing the fetch request, the request can be executed using a web service call which returns the data from the database according to the query specified in request. The module 206 can also include the logic to fade out an existing chart when the existing chart becomes stale. The module 206 can also include menu (e.g., ribbon) actions to control the visualizations and management of visualizations (e.g., Remove/Edit/Set as Default/Settings), for example.

The composite control component 204 can facilitate manipulating the grid and the visualization relative to each other. The charting component for streaming a chart image to a client, for example, in response to a drill-down process.

In other words, the data viewing system 200 can include the data component 102 for generating a grid of data, the visualization component 106 for associating one or more visualizations with the data of the grid 104, where the one or more visualizations render aggregate and non-aggregate summaries of the data on the grid 104, and the presentation component 110 for presenting the one or more visualizations proximate to the grid 104 in a server-based application.

The visualization component 106 builds a multiple content type response that embeds image data and an HTML document in a single response. The visualization is automatically updated, as described above, when a filter is applied to the grid data, and the grid is automatically updated in response to an interactive drill-down on the visualization. The system can further comprise the composite control component 204 for manipulating the grid and the visualization relative to each other, and the charting component 202 for streaming a chart image in response to a drill-down process.

The disclosed architecture can also be employed to enable the following scenarios. One of the powerful benefits of bi-directional communication can be realized by giving "What If" analysis capability. The grid can have in-context, editable fields that can be manipulated to determine (view) the effect on the visualization.

Additionally, the visualization pane can be utilized as an analysis whiteboard where the user can drop any column from the grid and view the associated visualization dynamically. This gives a business user flexibility and on-the-go analytics.

Moreover, deriving insight from data coming from diverse sources via one place to gain a complete picture is a valuable benefit. For example, businesses work with various integrated systems and have data flowing from one system into another. Having the capability to pull data from other data sources can give a richer analytic experience.

Another beneficial scenario deals with reporting and collaboration. Sharing detailed as well as consolidated information by exporting the data to a spreadsheet or sending the data out on email or to the printer can be obtained.

Analysis across entities provides a rich way to analyze data from perspectives and parameters spanning multiple related entities. Deep insight can be derived from mining data from nested linked entities, for example, products grouped by region. Accounts can be selected and the associated orders returned. The orders lead to the products and a geographical distribution of the products in terms of revenue in a map, for example.

Additionally, the visualization pane can act as a preview/history pane for the selected record in the grid. This gives a powerful way for the sales representative, for example, to get quick details on the customer to which the representative is speaking. The preview pane can also show comments or sticky notes for that record.

Note that although described in some areas of the description in the context of a CRM implementation, it is to be appreciated that this is not to be so limited.

Figure 3:
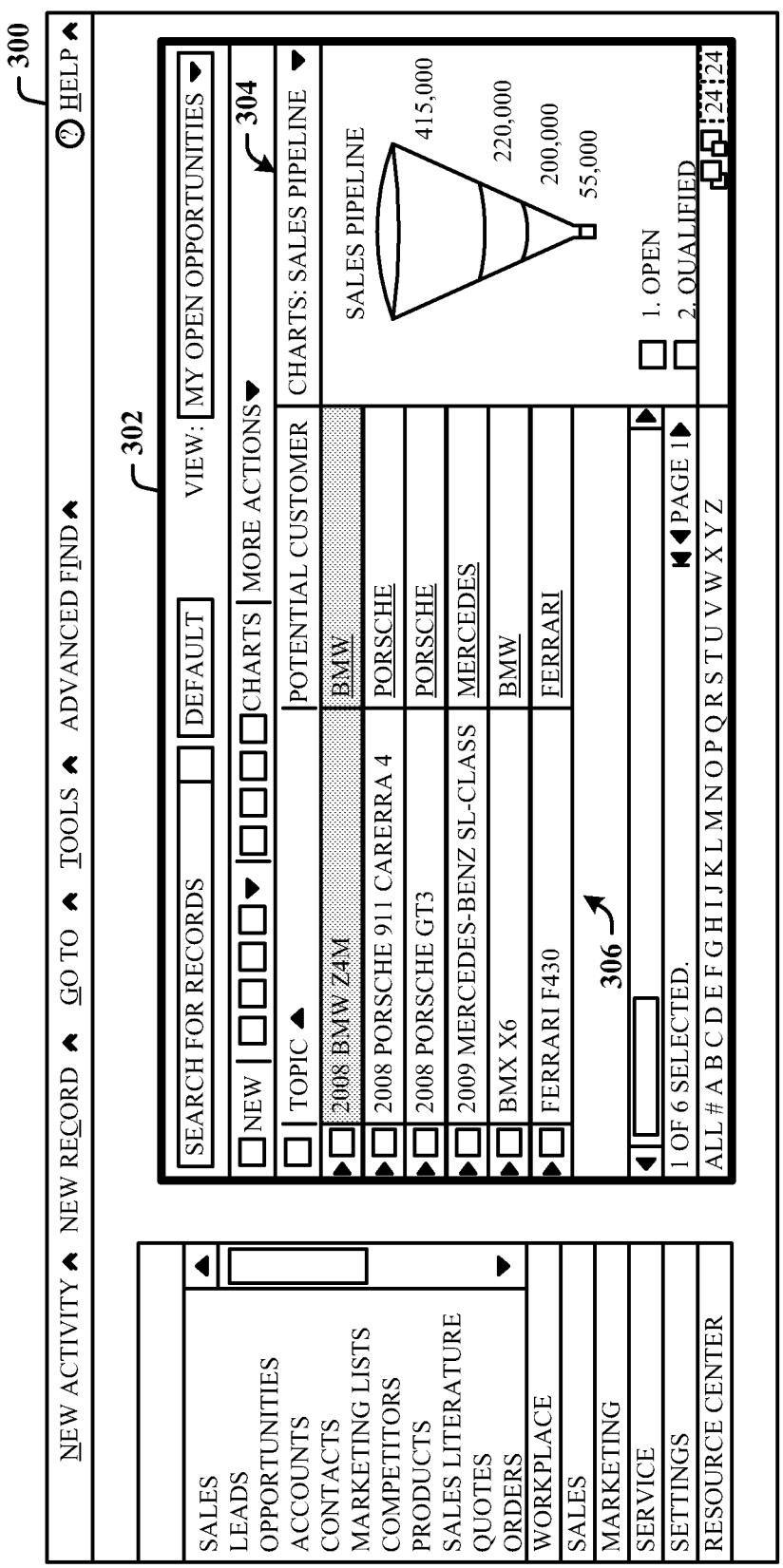
FIG. 3 illustrates an exemplary user interface depicting a visualization in which a chart pane is presented in combination with a grid.

FIG. 3 illustrates an exemplary user interface 300 depicting a visualization 302 in which a chart pane 304 is presented in combination with a grid 306. The grid 306 lists data and the chart pane 304 presents a funnel chart 308 for a sales pipeline for quick and easy visualization of data associated with all rows shown on the pages of the grid 306. The visualization 302 is showing the aggregation of opportunities by the stage that the opportunities are in. For example, the visualization 302 shows that for all the opportunities in the "Open" stage, the sum of estimated revenue is $415,000. Again this can be either aggregate or non-aggregate data. It is also within contemplation that a visualization can be enabled based on a set of rows that have been selected on the grid. For example, a map visualization may highlight the map region where the opportunity is located.

A different or same type of chart (e.g., funnel, bar, scatter, line, column, pie, etc.) can be automatically generated for all of the line items in the grid 306. For example, a bar chart can be auto-generated and presented in combination with that selected line item.

The visualization 302 can be manipulated such that the grid 306 can be sized to consume the entire visualization footprint, the chart pane 304 can be resized to consume the entire visualization footprint, or any variation inbetween.

Drill-downs are represented as a combination of the image (the actual or original chart) and an image map (the drillable regions in the chart). Drill-downs are enabled on the chart image by generating client-side image maps. To create a drillable visualization, image-based server controls (e.g., .NET charts) typically generate an image during the request for the page, and render the image as an <img> tag in HTML, along with the image map. However, the client browsers typically have to issue an additional request to download the actual image referenced in the tag. Therefore, the image used for generating the image map needs to be consistent with the image sent in the second request. In a server farm environment, however, it may not always be possible to ensure this, since the image stored in memory cannot be shared across multiple processes. Moreover, because of security considerations, the image is not persisted in the database or shared file systems.

A solution to this problem employs a multiple content type response which embeds both image and HTML in a single response thereby avoiding multiple requests. To achieve this, an MHTML (MIME HTML) format is leveraged for sending HTML document (containing image map) and image as one multipart/related document, in one response to client request, which also saves additional overhead on server, communication time and line bandwidth consumption. This solution ensures correct drill-down behavior in the server farm scenario.

FIG. 4 illustrates is an exemplary state diagram 400 and attached visualization. A first state 402 is where the user interface shows a grid without a visualization, in other words, only the grid is being used by the user. A second state 404 is where the user interface shows a grid with a transition to a visualization, in other words, the visualization is being rendered for the data on the grid. A third state 406 is where the user interface shows a grid with a transition to a visualization, and the visualization is consistent with the grid data. In other words, the visualization has been rendered in combination with the grid and is consistent with the grid data. A fourth state 408 is where the grid is presented, but the visualization is inconsistent with the grid data. In other words, the visualization has become invalid after one or more filters were applied on the grid. A fifth state 410 is where the grid is presented with visualization drill down, that is, drill down has been performed on the visualization. A sixth state 412 is where the grid is presented, but the visualization drill down is inconsistent, since one or more filters have been applied after drill down.

The state diagram 400 also shows that the user interface provides a button for toggling between the chart pane for user interaction and the grid for user interaction. Other state transitions are illustrated, such as refreshing an inconsistent state, updating a visualization, for example.

Figure 5:
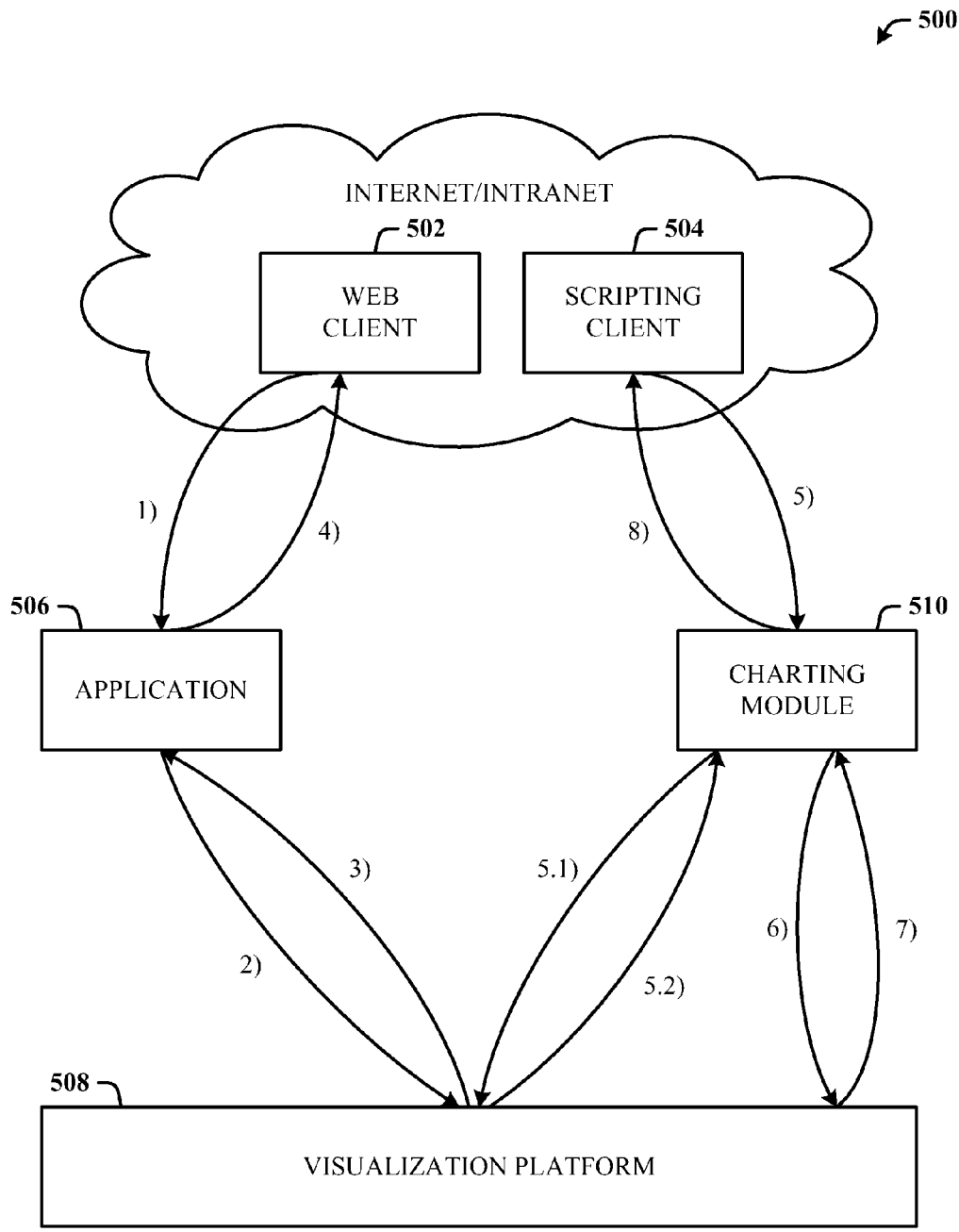
FIG. 5 illustrates a logical flow diagram for rendering visualizations to a client.

FIG. 5 illustrates a logical flow diagram 500 for rendering visualizations to a client 502. The first client 502 can be a browser, for example, or other client that can render information. The second client 504 can be a scripting client. A visualization application 506 can be a web application framework such as Asp.net that uses aspx files, for example, and code behind pages and web service methods at the server side. The visualization platform 508 can be the various APIs and calls that support generic operations on visualizations such as CRUD (create, retrieve, update, delete), import, export, etc. A charting module 510 refers to the platform-side as well as application-side code specific to the handling of charts (e.g., fetching and feeding the data to a chart, validating the XML of the visualizations, etc.).

Initially, at 1), the first client 502 makes a request to the application 506 for a page with a chart. At 2), the application 506 requests all associated visualizations for this view from the platform 508. The platform 508 obtains and responds to the application 506 with the associated visualizations. At 4), the application 506 sends the first client 502 a page with a placeholder for the chart and all associated visualizations.

At 5), the second client 504 includes a module that makes a script for chart rendering to the charting module 510. At 5.1), the charting module 510 sends a request to the platform 508 to validate the visualization definition. At 5.2), the platform 508 responds with the validation definition results to the charting module 510, such as validated. At 6), the charting module 510 queries the data using gridXML. At 7), the platform 508 returns an aggregate dataset to the charting module 510. At 8), the charting module returns the HTML of the chart to the second client 504.

Figure 6:
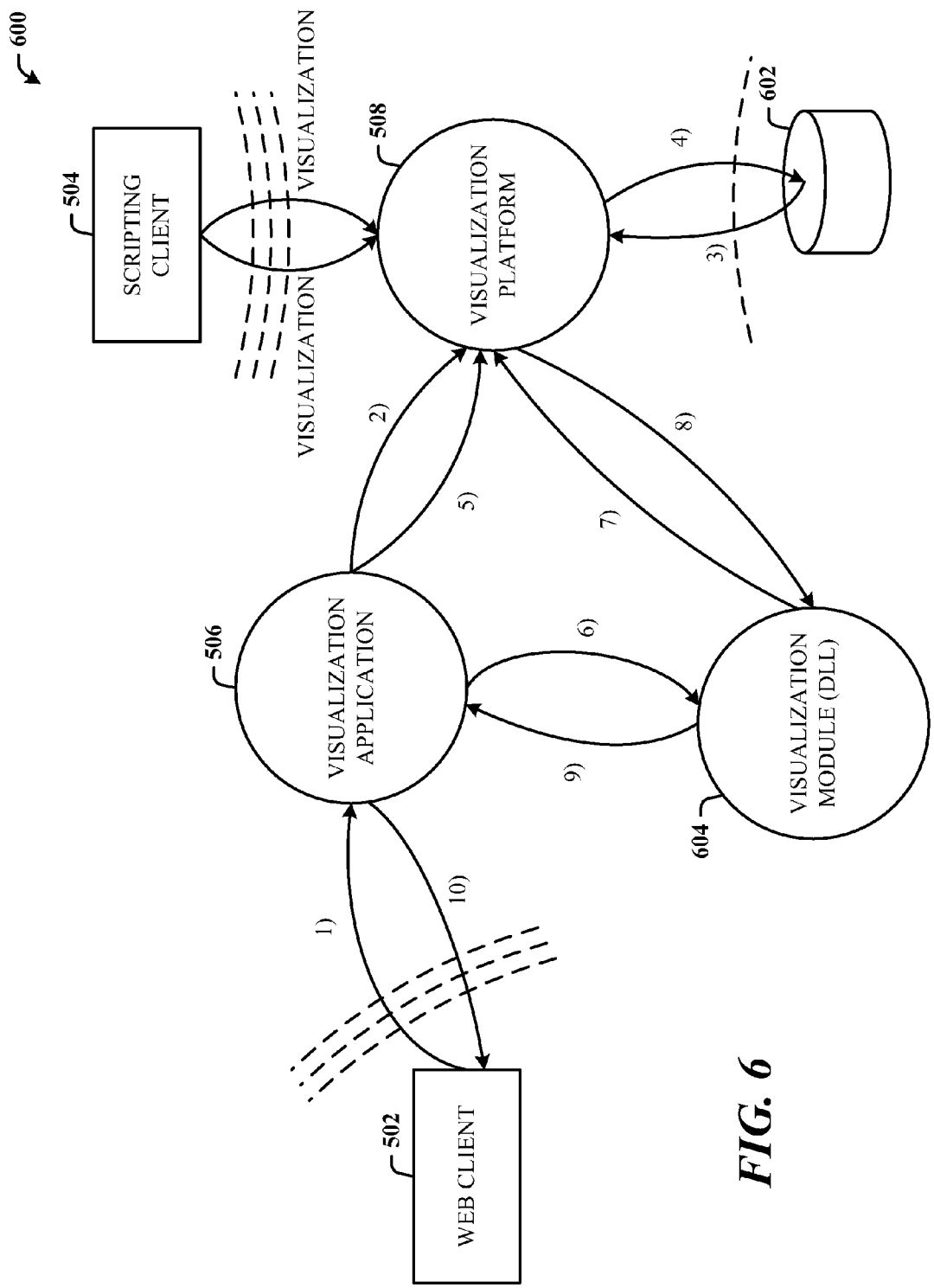
FIG. 6 illustrates a general data flow diagram.

FIG. 6 illustrates a general data flow diagram 600. As used herein, a ViewId identifies a particular database query that can be run to fetch the data for showing in the grid. The query includes the name of the entity and entity columns to fetch along with the conditions to filter the data. A visualization ID (vizID) identifies a particular visualization. A visualization is a way to arrange data that comes as a result of applying filter conditions of a view. The visualization defines what columns to fetch, what aggregate function to apply (applicable only for aggregates), and how to present the data visually (e.g., show a bar chart).

In one implementation, the data is fetched once for a given page on the grid and once for drawing the visualization, depending upon the mode (e.g., grid only, grid+viz, or viz only) in which the user is viewing the composite control. Note that both the view and visualization operate on the same set of data rows, a difference being that the view returns a subset of the whole set of rows, whereas the visualization returns a processed version (e.g., sum) of all the data rows.

At 1), the grid view ID (viewID), filter parameters, and vizID are passed from the web client 502 to the visualization application 506. At 2), the vizID is passed from the application 506 to the platform 508. At 3), the platform 508 queries a database 602. At 4), the database 602 returns results to the platform 508. At 5), the application 506 sends data and presentation information in the form of XML files to the platform 508. At 6), the application 506 also sends data and presentation information in the form of XML files to a visualization module 604. At 7), the module 604 sends a validation request to the platform 508 fetches XML, and the platform 508 sends the results back to the module 604, as indicated at 8). At 9), the module 604 sends the HTML information to the application 506. At 10), the visualization is sent from the application 506 to the web client 502.

As previously indicated, the disclosed architecture provides bi-directional update feature of the grid and associated visualization rendering to the user. In other words, the visualizations can be automatically updated when filters are applied on the grid, and when drill-down is performed on the visualization, the grid is automatically updated.

In a simplified example, consider that a user is viewing a chart showing the sum of a team's opportunities by sales representative. The user wants to delve into details of a particular sales representative Rep A, who has the largest share of estimated revenue. By selecting the chart, the user is presented with a menu for selecting a dimension (e.g., state) on which to drill down, and the chart type (e.g., pie chart). The system renders the opportunities of Rep A by state, and a grid beside the visualization updates to show the opportunities of Rep A. Based on the new visualization, the user is then able to visually infer that Rep A has the largest opportunities in a State B.

A drill-down chart can be computed as follows. The records for showing the drilled-down chart are obtained by filtering the view on the basis of the Rep A in the above description. When a user clicks on the image/chart for the image region that corresponds to Rep A, the system automatically understands that the filtering criteria of Rep A is to be applied to the grid. If there were some filters already present on the grid the filter condition is updated so that the condition restricts the grid to records based on the existing filter as well as Rep A. The user can add/remove more filter conditions as needed and the visualization continues to get updated (using an update visualization button). Filter conditions can be updated/modified by end users.

The category for the drill-down chart is obtained by the selection the user makes from the drill-down View By selector. The measure and aggregation function used for the drill-down are the same as the parent chart (the visualization attached to the view). The chart type is obtained from the selection that the user makes (e.g., chart type selector).

Figure 7:
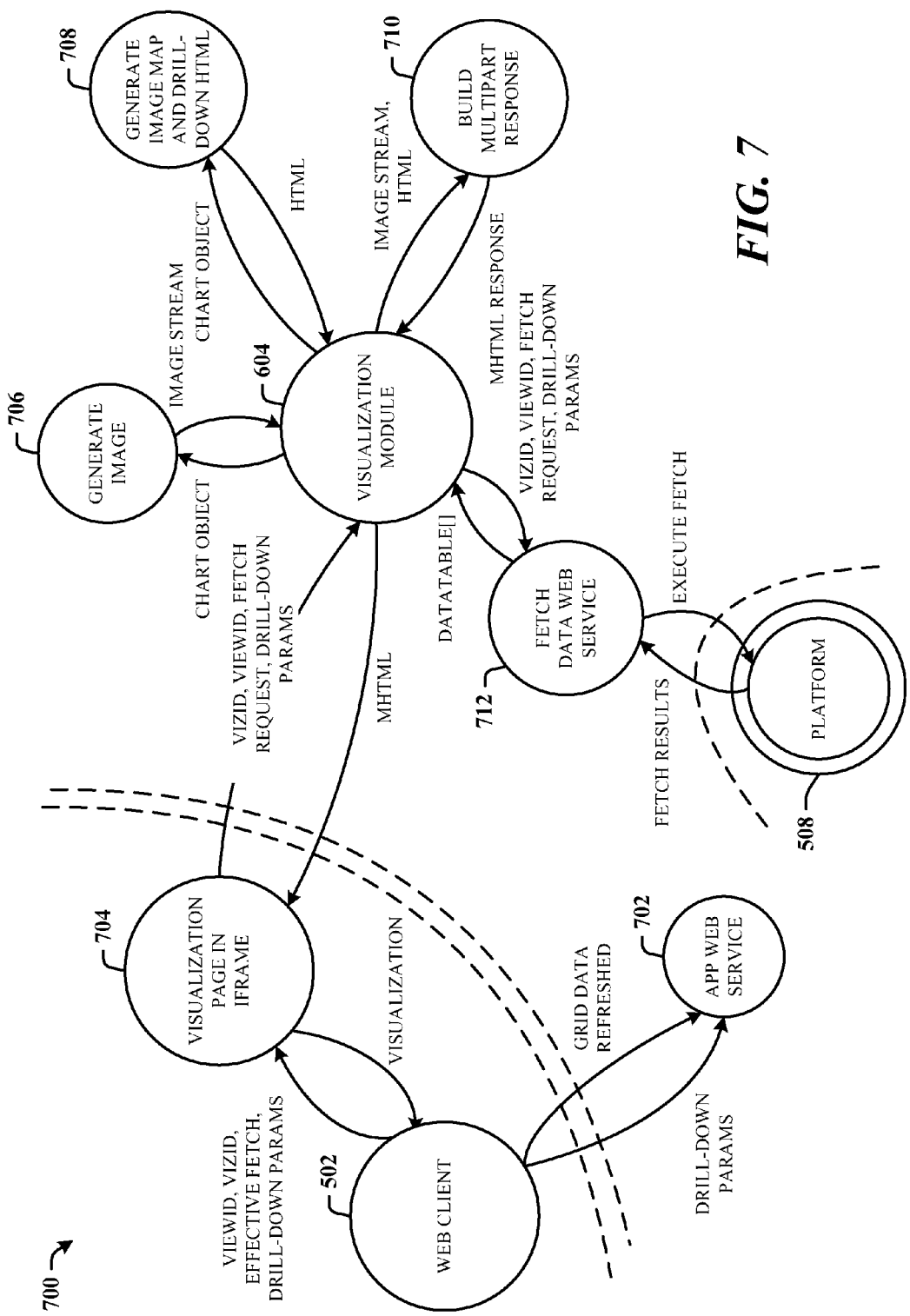
FIG. 7 illustrates an example of a detailed data flow diagram.

FIG. 7 illustrates an example of a detailed data flow diagram 700 that employs drill-down. A drill-down can be performed on any chart that is attached to the grid. When a user clicks on a drillable region of the chart, the user can be presented a popup that contains two selectors, for example, a View-by selector and a Chart type selector. The drill-down is performed after the user makes a selection and clicks on an OK button. The values provided by these two selectors are the drill-down parameters. The options in the view-by selector are other attributes of the same/related entities that can be displayed on the grid, and the options in the chart type dropdown are common chart types such as pie, column, bar, funnel, and line, for example. In other words, drill-down occurs when a user clicks on a particular component (e.g., a bar in a bar chart, a sector in a pie chart, etc.) of a chart to obtain a closer look into the data that constituted this component. The resultant data can be grouped by a different parameter. The drill-down parameters include at least two pieces of information: which component of the chart was clicked (which data point the user wants to drill-down on) and the new group-by parameter.

The web client 502 can access an application web service 702 and send drill-down parameters and refreshed grid data. The web client 502 can also request visualization by sending the viewID, vizID, the drill-down parameters, and a fetch command for the XML to a visualization page 704 in an IFrame (inline frame) that makes possible the embedding of an HTML document inside another HTML document. The vizID, viewed, drill-down parameters and fetch are then passed from the page 704 to the visualization module 604. The module 604 can send a chart object to generate an image 706, and the image 706 is then streamed back to the module 604. The module 604 can send the chart object to generate an image and drill-down HTML 708, with the HTML sent back to the module 604. The module 604 sends the image stream and HTML to build a multi-part response 710, which is then returned to the module 604 as an MHTML response.

The module 604 can also pass the vizID, viewed, drill-down parameters, and fetch request to a data web service 712. The web service 712 executes the fetch against the visualization platform 508 and the platform 508 returns the fetch results back to the service 712. The service 712 passes the results to the module 604 as a data table. The module 604 returns the MHTML to the visualization page 704, which is then passed back to the web client 502 for presentation with the grid.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
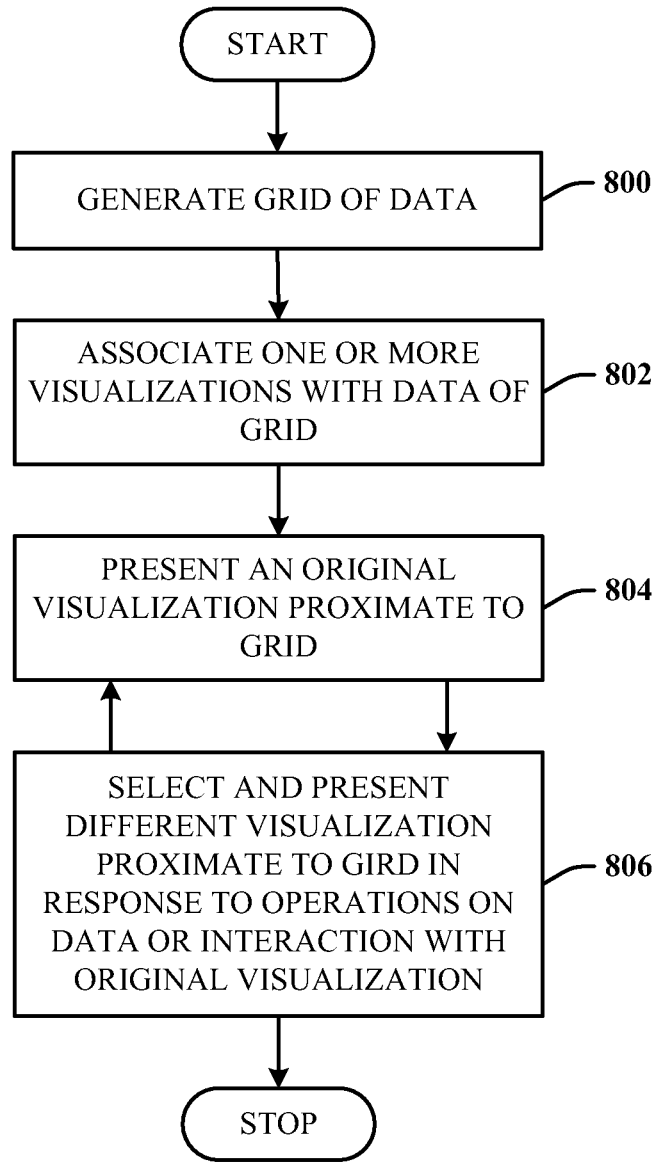
FIG. 8 illustrates a method of viewing data.

FIG. 8 illustrates a method of viewing data. At 800, a grid of data is generated. At 802, one or more visualizations are associated with the data of the grid. At 804, an original visualization is presented proximate to the grid. At 806, a different visualization is selected and presented proximate to the grid in response to operations on the grid data or interaction with the original visualization. Users can navigate between various states, such as between 804 and 806, for example.

The method can further comprise building a multiple content type response that embeds an image and an image map in a single response for drill-down of a visualization, which is a chart, generating a composite control in a web page that facilitates relative sizing and layout of the grid and a visualization, and checking consistency of a visualization with the grid data. Again, the user can navigate back and forth between these states. The data can be related to customer relations management where the visualization represents the data as a chart.

Figure 9:
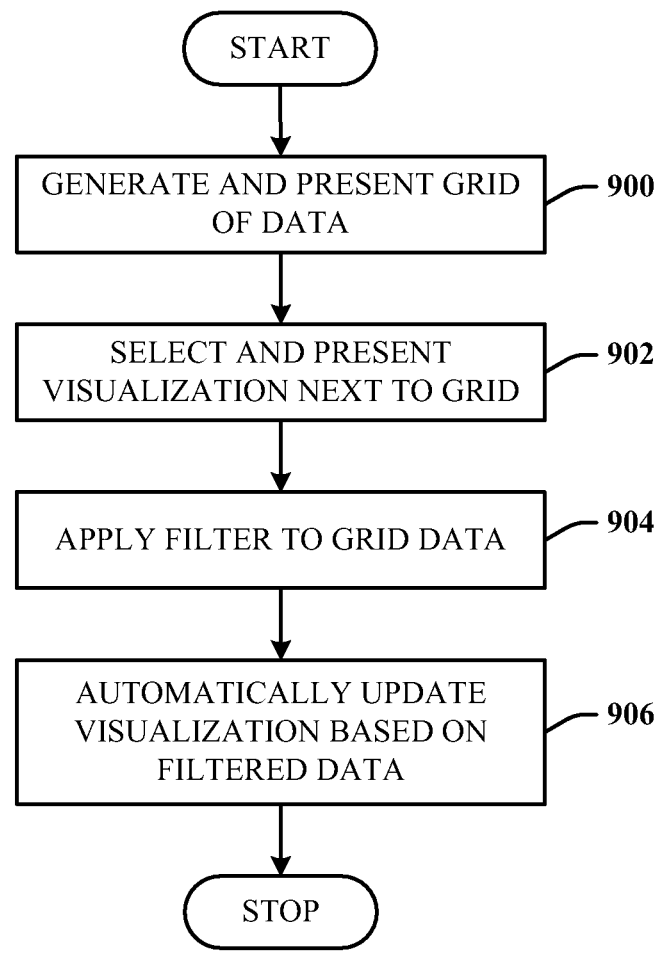
FIG. 9 illustrates a method of updating a visualization based on filtering of the grid data.

FIG. 9 illustrates a method of updating a visualization based on filtering of the grid data. At 900, a grid of data is generated and presented. At 902, a visualization is selected and presented next to the grid. At 904, a filter is applied to the grid data. At 906, the visualization is automatically updated based on the filtered data.

Figure 10:
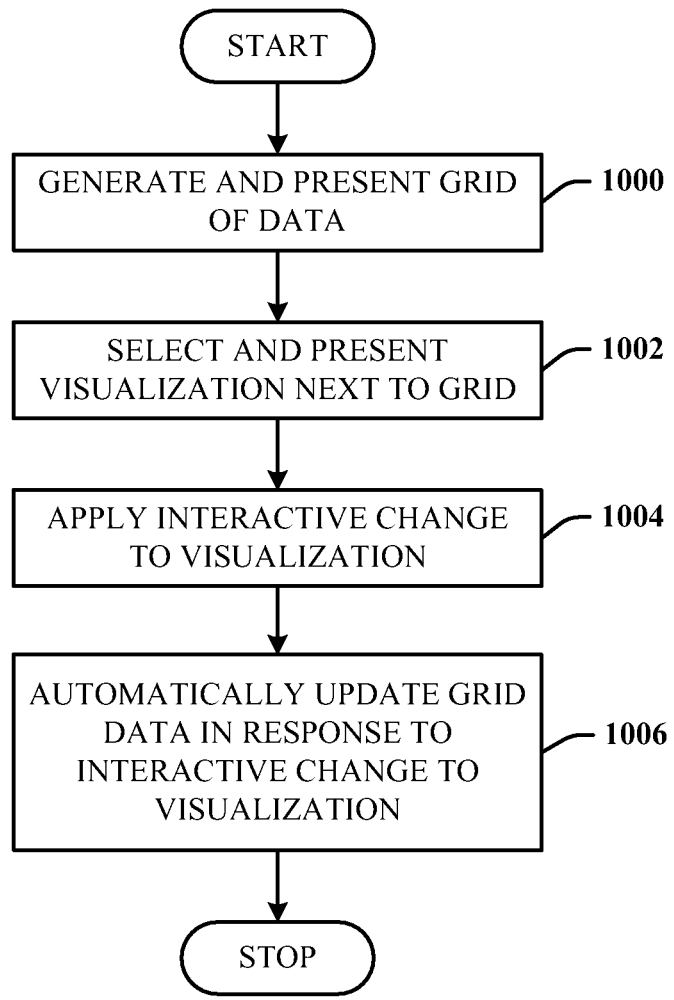
FIG. 10 illustrates a method of updating grid data based on an interactive change to a visualization.

FIG. 10 illustrates a method of updating grid data based on an interactive change to a visualization. At 1000, a grid of data is generated and presented. At 1002, a visualization is selected and presented next to the grid. At 1004, an interactive change is applied to the visualization. At 1006, the data is automatically updated based on the interactive change to the visualization.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
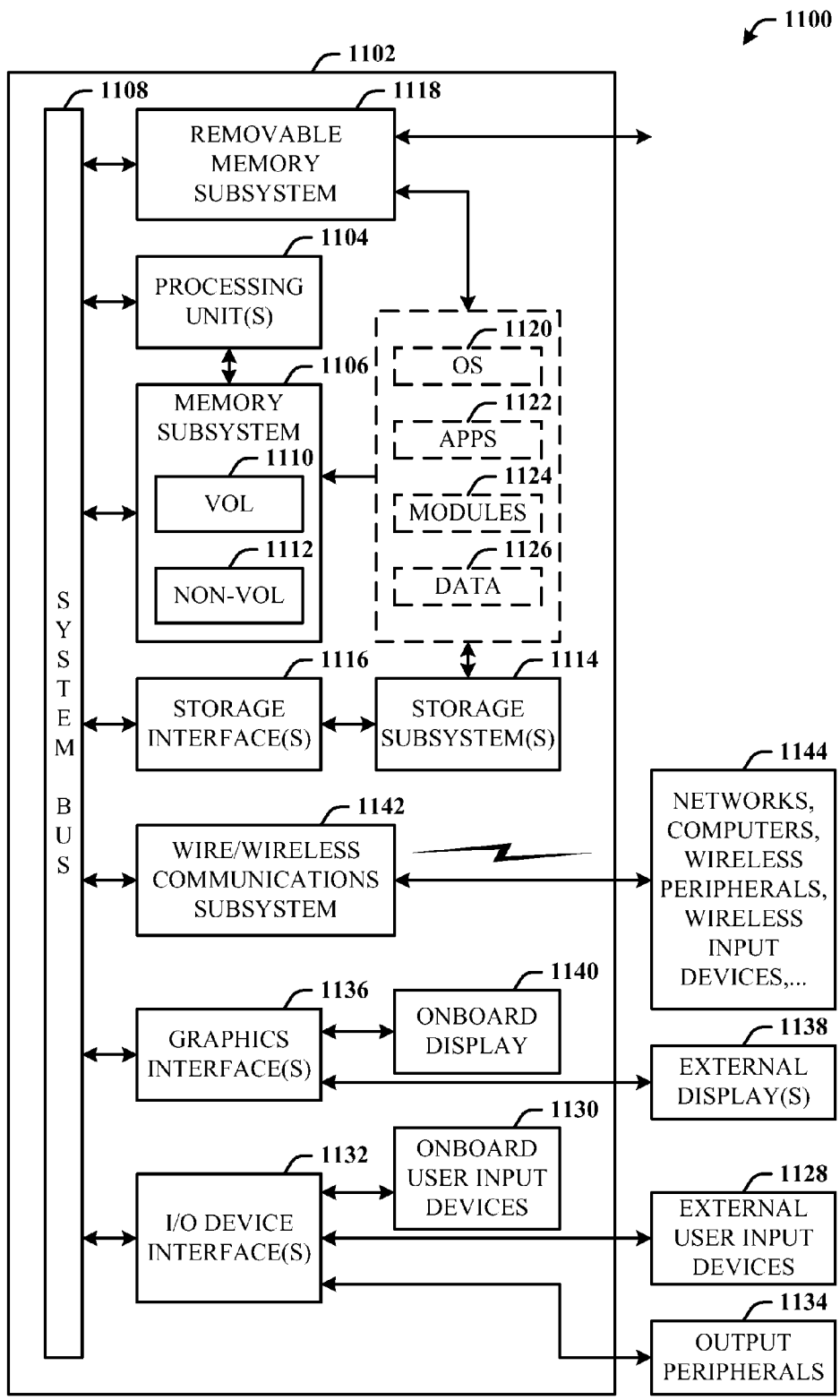
FIG. 11 illustrates a block diagram of a computing system operable to execute grid and visualization combinations in accordance with the disclosed architecture.

Referring now to FIG. 11, there is illustrated a block diagram of a computing system 1100 operable to execute grid and visualization combinations in accordance with the disclosed architecture. In order to provide additional context for various aspects thereof, FIG. 11 and the following discussion are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104, a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1106 can include volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the memory subsystem 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes storage subsystem(s) 1114 and storage interface(s) 1116 for interfacing the storage subsystem(s) 1114 to the system bus 1108 and other desired computer components. The storage subsystem(s) 1114 can include one or more of a hard disk drive (HDD), a magnetic floppy disk drive (FDD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a removable memory subsystem 1118 (e.g., flash drive form factor technology), and/or the storage subsystem(s) 1114, including an operating system 1120, one or more application programs 1122, other program modules 1124, and program data 1126. Generally, programs include routines, methods, data structures, other software components, etc., that perform particular tasks or implement particular abstract data types. The one or more application programs 1122, other program modules 1124, and program data 1126 can include the system 100 of FIG. 1, the system 200 of FIG. 2, the UI 300 of FIG. 3, the state diagram 400 of FIG. 4, the flow diagram 500 of FIG. 5, the general data flow diagram 600 of FIG. 6, the more detailed data flow diagram 700 of FIG. 7, and the methods represented in FIGS. 8-10, for example.

All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Computer readable media can be any available media that can be accessed by the computer 1102 and includes volatile and non-volatile media, removable and non-removable media. For the computer 1102, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1102, programs, and data using external user input devices 1128 such as a keyboard and a mouse. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example. These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP) using logical connections via a wire/wireless communications subsystem 1142 to one or more networks and/or other computers. The other computers can include workstations, servers, routers, personal computers, microprocessor-based entertainment appliance, a peer device or other common network node, and typically include many or all of the elements described relative to the computer 1102. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wire/wireless communication subsystem 1142 (e.g., a network interface adapter, onboard transceiver subsystem, etc.) to communicate with wire/wireless networks, wire/wireless printers, wire/wireless input devices 1144, and so on. The computer 1102 can include a modem or has other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 12:
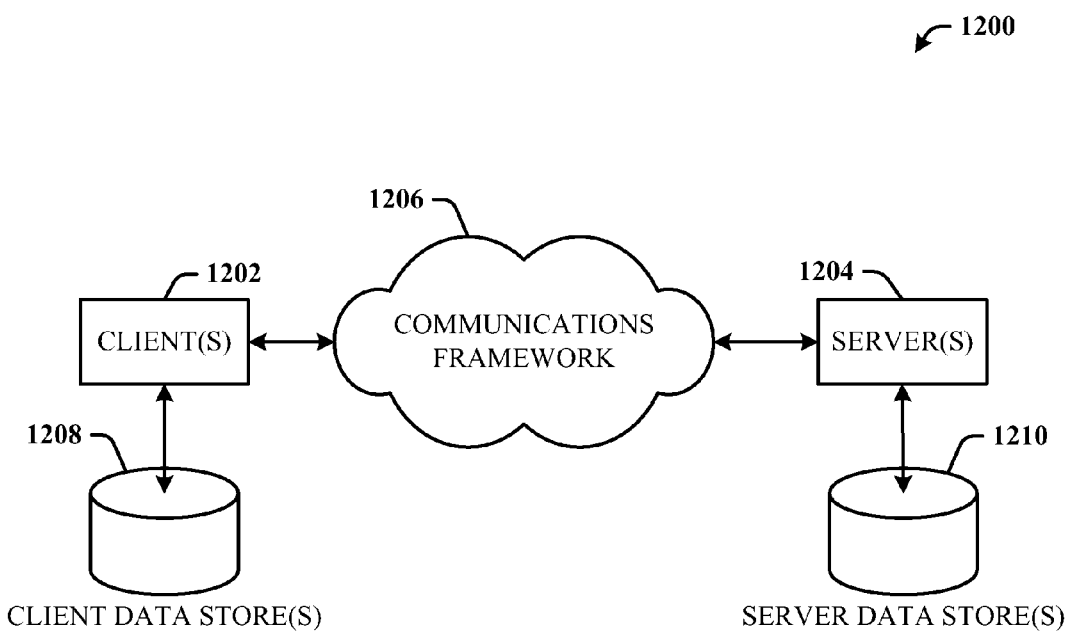
FIG. 12 illustrates a schematic block diagram of a computing environment for web-based grid/visualization presentation.

Referring now to FIG. 12, there is illustrated a schematic block diagram of a computing environment 1200 for web-based grid/visualization presentation. The environment 1200 includes one or more client(s) 1202. The client(s) 1202 can be hardware and/or software (e.g., threads, processes, computing devices). The client(s) 1202 can house cookie(s) and/or associated contextual information, for example.

The environment 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The environment 1200 includes a communication framework 1206 (e.g., a global communication network such as the Internet) that can be employed to facilitate communications between the client(s) 1202 and the server(s) 1204.

Communications can be facilitated via a wire (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data viewing system, the system comprising:
   a processor; and
   a memory in communication with the processor, the memory comprising and computer-executable instructions, which, when executed by the processor, cause the processor to:
   retrieve at least a portion of data in a database,
   generate a grid based upon the at least a portion of the data,
   send the grid for display,
   accept a request to display at least a portion of the data in the grid in a graphical format,
   send a data page with the grid data and with a placeholder for a graphical format,
   determine graphical formats available to display the grid data,
   send a listing of the available graphical formats,
   accept a designation of an available graphical format,
   accept a designation of grid data to be represented in the designated graphical format,
   retrieve data from the database corresponding to the designated grid data,
   generate a graphical representation of the retrieved data in the designated graphical format, and
   send the graphical representation to replace the placeholder in the data page.

2. The system of claim 1, wherein the memory further comprises computer-executable instructions, which, when executed by the processor, cause the processor to:
   accept a request to apply a filter to the grid data;
   apply the filter to the grid data;
   send a data page with the filtered grid data;
   determine whether the graphical representation is a valid representation of the filtered grid data;
   if the graphical representation is not a valid representation then modify the graphical representation to indicate that the graphical representation is not a valid representation of the filtered grid data;
   send the modified graphical representation and an option to update the graphical representation;
   accept a request to update the graphical representation;
   update the graphical representation in view of the filtered grid data; and
   send the modified graphical representation to be inserted into the data page.

3. The system of claim 1, wherein the memory further comprises computer-executable instructions, which, when executed by the processor, cause the processor to:
   accept a request for an interactive drill-down on the graphical representation;
   automatically update the grid in response to the interactive drill-down request on the graphical representation;
   automatically updating the graphical representation in response to the interactive drill-down request; and
   send the updated grid and the updated graphical representation.

4. The system of claim 1 wherein the memory further comprises computer-executable instructions which, when executed by the processor, cause the processor to:

accept a request to filter the data in the grid;
filter the data in the grid; and
update the graphical representation to reflect the filtered grid data.

5. The system of claim 1 wherein the memory further comprises computer-executable instructions which, when executed by the processor, cause the processor to:
accept a request to apply a filter to the data in the grid; and
fade an existing graphical representation in response to the request to apply the filter.

6. The system of claim 5 wherein the memory further comprises computer-executable instructions which, when executed by the processor, cause the processor to:
accept a request to update the graphical representation in response to the filter being applied;
update the graphical representation; and
send the updated graphical representation for display.

7. A computer-readable storage medium that is not a signal, the computer-readable storage medium comprising computer-executable instructions, which, when executed by a computer, cause the computer to:
generate one or more grids, each grid being based upon at least a portion of data retrieved from a database;
send at least one grid for display;
accept a request to display at least a portion of the data in the at least one grid in a graphical format;
send a data page with the at least one grid and with a placeholder for a graphical format;
determine graphical formats available to display the data in the at least one grid;
send a listing of the available graphical formats;
accept a designation of an available graphical format;
accept a designation of data to be represented in the designated graphical format;
retrieve from the database data corresponding to the designated data;
generate a graphical representation of the retrieved data in the designated graphical format; and
send the graphical representation to replace the placeholder in the data page.

8. The computer-readable storage medium of claim 7, further comprising computer-executable instructions, which, when executed by the computer, cause the computer to:
accept a request to filter the data;
apply a filter to the data;
automatically update the graphical representation in response to the filter being applied to the data;
accept a request for an interactive drill-down on the graphical representation; and
automatically update the graphical representation in response to the interactive drill-down request.

9. The computer-readable storage medium of claim 7, further comprising computer-executable instructions which, when executed by the computer, cause the computer to:
accept a request to apply a filter to the grid data;
apply the filter to the grid data;
send a data page with the filtered grid data;
determine whether the graphical representation is a valid representation of the filtered grid data;
if the graphical representation is not a valid representation then modify the graphical representation to indicate that the graphical representation is not a valid representation of the filtered grid data;
send the modified graphical representation and an option to update the graphical representation;
accept a request to update the graphical representation;
update the graphical representation in view of the filtered grid data; and
send the modified graphical representation to be inserted into the data page.

10. The computer-readable storage medium of claim 7, further comprising computer-executable instructions which, when executed by the computer, cause the computer to:
accept a request to filter the data in the grid;
filter the data in the grid; and
update the graphical representation to reflect the filtered grid data.

11. The computer-readable storage medium of claim 7, further comprising computer-executable instructions which, when executed by the computer, cause the computer to:
accept a request to apply a filter to the data in the grid; and
fade an existing graphical representation in response to the request to apply the filter.

12. The computer-readable storage medium of claim 11, further comprising computer-executable instructions which, when executed by the computer, cause the computer to:
accept a request to update the graphical representation in response to the filter being applied;
update the graphical representation; and
send the updated graphical representation for display.

13. A computer-implemented method of viewing data, the computer-implemented method comprising performing computer-implemented operations for:
obtaining data from a database;
generating a grid based upon the data;
sending the grid of the data for display;
accepting a request to display the data in a graphical format;
sending a data page with the grid and with a placeholder for a graphical format;
determining graphical formats available to display the data;
sending a listing of the available graphical formats;
accepting a designation of an available graphical format;
accepting a designation of data to be represented in the designated format;
retrieving from the database data corresponding to the designated data;
generating a graphical representation of the designated data in the designated graphical format; and
sending the graphical representation to replace the placeholder in the data page.

14. The method of claim 13, further comprising accepting a request for an interaction invoking a drill-down process to be performed on the graphical representation, performing the drill-down process, and updating the grid of data based on the drill-down process performed on the graphical representation.

15. The method of claim 13, further comprising:
accepting a request to apply a filter to the grid data;
applying the filter to the grid data;
sending a data page with the filtered grid data;
determining whether the graphical representation is a valid representation of the filtered grid data;
if the graphical representation is not a valid representation then modifying the graphical representation to indicate that the graphical representation is not a valid representation of the filtered grid data;
sending the modified graphical representation and an option to update the graphical representation;
accepting a request to update the graphical representation;
updating the graphical representation in view of the filtered grid data; and sending the modified graphical representation to be inserted into the graphical representation.

16. The method of claim 13, further comprising:
accepting a request to apply a filter to the data in the grid; and
fading an existing graphical representation in response to the request to apply the filter.

17. The method of claim 16, further comprising:
accepting a request to update the graphical representation in response to the filter being applied;
updating the graphical representation; and
sending the updated graphical representation for display.

\* \* \* \* \*